United States Patent
Shields et al.

[11] Patent Number: 5,331,346
[45] Date of Patent: Jul. 19, 1994

[54] APPROXIMATING SAMPLE RATE CONVERSION SYSTEM

[75] Inventors: Jerome D. Shields, Atco; Kenneth E. Vavreck, Maple Shade, both of N.J.

[73] Assignee: Panasonic Technologies, Inc., Secaucus, N.J.

[21] Appl. No.: 957,721

[22] Filed: Oct. 7, 1992

[51] Int. Cl.$^5$ .............. H04N 11/20; H04N 7/01
[52] U.S. Cl. .................. 348/441; 348/445; 341/61; 364/724.1
[58] Field of Search ............ 358/11, 140, 141, 12, 358/13, 22; 341/61, 50; 364/724.1; H04N 11/20, 7/01

[56] References Cited

U.S. PATENT DOCUMENTS

| | | | |
|---|---|---|---|
| 4,471,381 | 9/1984 | Kasuga et al. | |
| 4,630,034 | 12/1986 | Takahashi | 341/61 |
| 4,870,661 | 9/1989 | Yamada et al. | 341/61 |
| 4,903,019 | 2/1990 | Ito | 341/61 |
| 4,954,824 | 9/1990 | Yamada et al. | 341/61 |
| 4,989,221 | 1/1991 | Oureshi et al. | 375/8 |
| 5,057,911 | 10/1991 | Stec et al. | |
| 5,101,368 | 3/1992 | Torri et al. | 341/61 |
| 5,119,093 | 6/1992 | Vogt et al. | 341/61 |
| 5,159,339 | 10/1992 | Fujita | |
| 5,204,827 | 4/1993 | Fujita et al. | 364/724.16 |

*Primary Examiner*—James J. Groody
*Assistant Examiner*—Michael H. Lee
*Attorney, Agent, or Firm*—Ratner & Prestia

[57] ABSTRACT

A sample rate conversion system converts from an input sample rate stream having a predetermined input sample rate to an output sample stream having a predetermined output sample rate by interpolating output samples from the input samples using first and second approximate sample rate ratios. The system includes circuitry which selects a sequence of interpolation filters from among a set of filters, the sequences being defined by one of these approximate ratios, and circuitry which monitors the magnitude of the accumulated error introduced by the approximation. When this accumulated error becomes greater than a threshold, the system changes to use a further sequence of interpolation filters based on the other approximate ratio. The accumulated error changes in a positive sense with each successive sample while one of the two approximate ratios is used. The accumulated error changes in a negative sense with each successive sample while the other of the two approximate ratios is used. The system switches between these sample rate ratios to maintain the magnitude of the position error of the interpolated samples below a predetermined threshold value. A sample rate conversion system which converts a television signal in CCIR (601) format into a Phase Alternate Line (PAL) video signal is disclosed.

15 Claims, 8 Drawing Sheets

APPROXIMATING SAMPLE RATE CONVERSION SYSTEM

BACKGROUND OF THE INVENTION

The present invention concerns a system for resampling one sampled data signal to generate another sampled data signal where the two sampled data signals have different sample rates, and in particular, to such a system which resamples signals having respective sampling rates that may be represented as a ratio of two large relatively prime integers.

Sample rate conversion systems are well known for converting information bearing signals from one format to another code. Such systems are commonly used for data telemetry, audio signal processing, and video signals standards conversion.

An exemplary video signal standards conversion system is described in U.S. Pat. No. 5,057,911 entitled, SYSTEM AND METHOD FOR CONVERSION OF DIGITAL VIDEO SIGNALS, which is hereby incorporated by reference for its teachings on digital resampling techniques.

The system described in the above-referenced patent converts video signals having a nominal sample rate of 13.5 MHz into a digital signal having a sample rate of 14.31818 MHz, (hereinafter 14.3 MHz) which is compatible with the National Television Standards Committee (NTSC) Standard. The ratio of these two sample frequencies is exactly equal to the ratio of 33 to 35.

Accordingly, the standards conversion system described in the referenced patent generates 35 output samples for every 33 input samples that it receives. This is accomplished using 35 interpolation filters which generate interpolated samples at 35 respective positions between any two of the input samples. The filter, $X_{i+1}$, which is selected to generate the $i+1^{th}$ output sample is defined by equation (1).

$$X_{i+1} = (X_i 33) \text{ MOD } 35 \qquad (1)$$

This technique of sample rate conversion works well when the input and output sample rates can be represented as a ratio of two relatively small numbers. When, however, the ratio of these rates cannot be represented to a high degree of precision by a manageable ratio, this conversion process may be inaccurate or unduly expensive to implement.

For example, consider a resampling circuit which converts from the CCIR (601) standard having a nominal sample rate of 13.5 MHz to the Phase Alternate Line (PAL) standard which has a sample rate of 17.734475 (hereinafter 17.7) MHz. The smallest exact ratio between these two sampling frequencies is 540,000 over 709,379. Thus, if the scheme described above were used to resample the CCIR (601) signal into a PAL digital signal, 709,379 digital filters would be required. At the current state of the art, it is impractical to implement a video standards conversion system having 709,379 filters.

An alternative sampling scheme may be to use a ratio which approximates the desired ratio and to periodically reset the resampling system, for example, once per horizontal line in order to prevent errors from propagating. This scheme, however, is relatively complex since the starting sample interpolation filter changes from line to line. In addition, this scheme may result in an excessively distorted image causing the individual lines of the image to be either shorter or longer than they would be if the proper sequence of interpolation filters were used.

SUMMARY OF THE INVENTION

The present invention is embodied in a sample rate conversion system which is based on first and second approximate ratios between the input and output sample rates. The system includes circuitry which iteratively selects interpolation filters from among a set of filters based on the first approximate ratio, and circuitry which monitors the accumulated position error introduced by the approximation. When this monitored error becomes greater than a threshold, the system uses the second approximate ratio to select the sequence of filters. Between any two consecutive samples of the second sampled data signal, the accumulated sample position error changes in a positive sense while resampling according to one of the approximate sample ratios and changes in a negative sense while resampling according to the other of the approximate sample ratios. The process iteratively switches between the two sample rate ratios to maintain the accumulated position error below a threshold value.

DETAILED DESCRIPTION

In general terms, the subject resampling system operates by using two ratios which cause opposite errors in the resampled signal. As the resampled signal is developed, the error caused by the ratio currently being used is continually monitored. When, in the exemplary embodiment of the invention, this error exceeds a predetermined threshold, the system switches to use the other ratio, causing the error to decrease (i.e. . go from a positive error to a negative error). Using this technique, the error in the output signal does not accumulate above the threshold value. The sequence of interpolation filters is automatically changed to achieve the desired error characteristics. In addition, the largest single error may be kept small by using a small error threshold. The minimum threshold which may be used, however, is determined by the approximate sample-rate ratio which is chosen.

Figure 1:
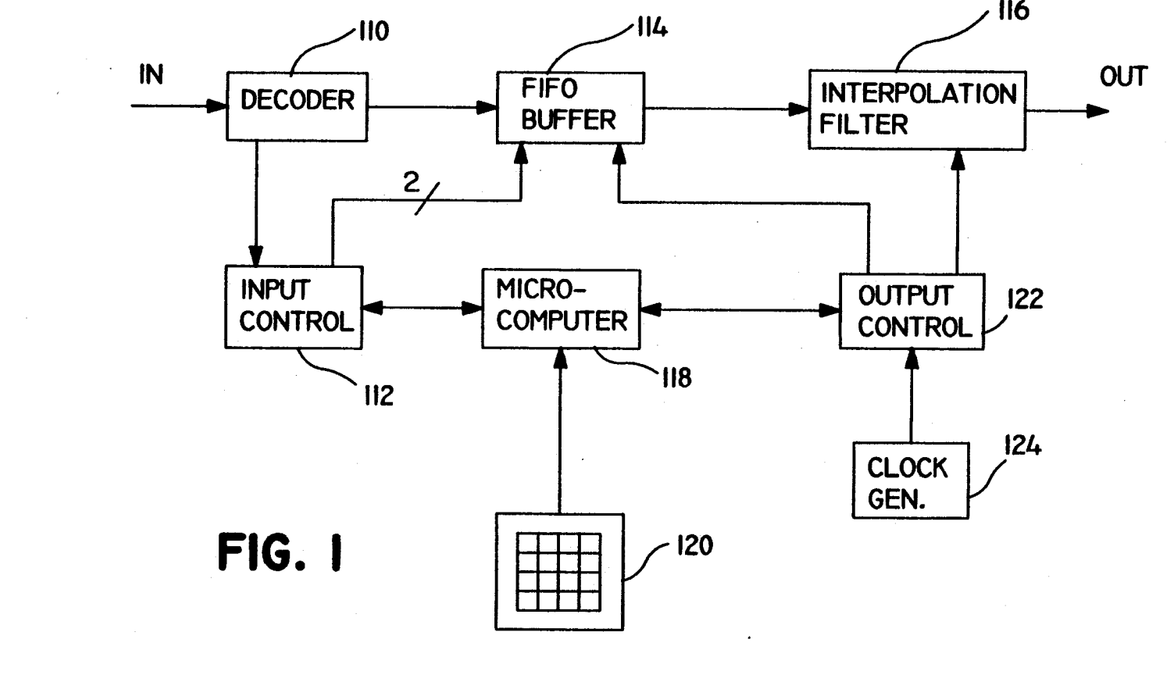
FIG. 1 is a block diagram of a sample rate conversion system which includes an embodiment of the invention.

The exemplary system for implementing this general resampling scheme is shown in FIG. 1. In this system, a sampled data signal IN is applied to a decoder 110. The signal IN includes both the sampled data and an encoded clock signal. The decoder 110 strips the clock signal from the data and applies it to input control circuitry 112. The circuitry 112, in turn, applies the clock signal and a write control signal to a first-in, first-out (FIFO) buffer 114. A data input port to the buffer 114 is coupled to receive the data values from the decoder 110. Responsive to the write control signal, these data values are successively written into the FIFO buffer 114.

Data values are read from the FIFO buffer 114 under the control of output control circuitry 122. The circuitry 122 is responsive to an output clock signal provided by clock generator 124 and to control parameters provided by a microcomputer 118. In response to the clock signal and using these parameters, the output control circuitry 122 retrieves data values from the FIFO buffer 114 as they are needed by an interpolation filter 116. The interpolation filter 116, which may, for example, be identical to the filter described below with reference to FIGS. 4a and 4b, combines multiple samples from the FIFO buffer 114 to generate each sample of the output signal OUT. This filter uses dedicated interpolator circuits such as those described in the above-referenced U.S. Patent. These interpolators are, in reality, programmable filters each of which may be programmed as a time-division multiplexed (TDM) plurality of filters. These TDM filters are applied in a predetermined sequence to generate output samples which occur at a rate that is different from the rate of the input samples, of the signal IN.

In a first embodiment of the invention, the output control circuitry 122 determines which of the plurality of filters is to be used at any given time in response to the clock signal provided by the clock generator 124 and the parameters provided by the microcomputer 118. The microcomputer 118 generates these parameters from data provided by a user via, for example, an input keypad 120.

The operation of the circuitry shown in FIG. 1 is illustrated with reference to the flow chart diagram shown in FIGS. 2a and 2b. This flow-chart diagram shows the operation of the sample-rate conversion system both in the establishment of the parameters and in interpolating output samples from input samples using those parameters.

The first step in the process illustrated by this flow-chart, step 210, obtains input variables from the input circuit 120 and calculates initial values used by the program. The input variables are IN_RATE, the input sample rate; OUT_RATE, the output sample rate; MIN_FILT, the minimum number of filters to be used by the interpolator 116; and MAX_FILT, the maximum number of filters which may be used by the interpolator 116.

Since, as described below, the luminance and chrominance signals are interpolated separately, and since the chrominance signal has one-half the sample rate of the luminance signal, ideally, twice as many interpolation filters should be used to generate the interpolated chrominance signal as are used to generate the interpolated luminance signal. The two embodiments of the invention described herein, however, use the same number of filters to interpolate both the luminance and chrominance samples. The luminance filters are used in one of two predetermined sequences. The chrominance filter used for any given sample is either the same as the luminance filter or it is at a complementary position in the intersample interval.

The calculations described below determine how many sets of filter coefficients are to be used to resample the luminance and chrominance signal. The value MAX_FILT is set to the maximum number of coefficient sets (i.e. TDM filters) which can be implemented in the interpolation filter 116. The value of MIN_FILT may be set to a value of two or to some higher number representing a minimum acceptable granularity in the interpolated sample positions.

At step 210, the process next calculates the greatest common factor (GCF) for the input and output rates. This may be done using any one of a number of widely available algorithms. After the GCF has been calculated, the supplied IN_RATE and OUT_RATE values are divided by this greatest common factor and the results are stored into the IN_RATE and OUT_RATE variables, respectively. By definition, the values held by the variables IN_RATE and OUT_RATE are relatively prime. The last operation performed in step 210 is to set the value of MAX_FILT to the minimum of the newly calculated value of OUT_RATE and MAX_FILT, and to set the value of MIN_FILT to the minimum of the value MIN_FILT and the newly calculated value of OUT RATE.

After step 210, step 212 is executed. In this step, the process assigns the value of IN_RATE divided by OUT_RATE to the variable RATIO. At step 214, the variable B is set to MAX_FILT and a variable ERR-MIN is set to 1. The variable B will eventually hold the number of filters which are to be programmed in the interpolation filter 116. These filters are used to resample the luminance and chrominance components of the input signal IN.

At step 216, the value B is compared to MIN_FILT. If B is greater than MIN_FILT, step 218 is executed. In this step, the variable I is set to RND(OUT_RATE/B), the rounded integer part of OUT_RATE divided by B, and the variable RB is set to the value of OUT_RATE MOD B, OUT_RATE minus the quantity B times I. The maximum position shift error, ERR, for the approximation ratio A over B is given by the equation (2).

$$ERR = (1 + ABS(RB))/(2*OUT\_RATE) \quad (2)$$

where ABS(X) signifies the absolute value of X.

If at step 220, the newly calculated value of ERR is less than the stored value ERRMIN then at step 222, ERRMIN is assigned the value held by ERR and the values B, I and RB are saved in the respective variables SB, SI and SRB. After step 222, or after step 220, if ERR is not less than ERRMIN, step 224 is executed. This step decrements the value of B and branches back to step 216 to try the next lower value of B to determine if it would provide a better ratio for approximating the ratio of the input and output rates.

When, at step 216, the value of B falls below MIN_FILT, control is passed to step 225. At step 225, the optimal values B, I and RB are recovered from the respective variables SB, SI and SRB and control is transferred to step 226. If at step 226, the stored value ERRMIN is equal to 0, then an exact ratio was found, which fits the filter requirements of the interpolator 116. If an exact ratio exists, it should be used rather than an approximate ratio. Step 228 calculates the value of a variable A as the integer part of the value of RATIO * B. This step also sets a boolean variable CORERR and sets a variable RA according to equation (3).

$$RA = IN\_RATE - A * I \quad (3)$$

After step 228, or after step 226, if ERRMIN is greater than 0, step 230 is executed. This step calculates B sets of filter coefficients representing B interpolated sample positions between any two luminance samples of the input signal IN. Also at step 230, these B sets of filter coefficients are loaded into the interpolators of the interpolation filter 116. Next, step 230 passes control through off-page connector A to step 232 of FIG. 2b.

In the exemplary embodiment of the invention where the signal IN is a CCIR (601) video signal and the output signal is a PAL composite video signal, the inventors have determined that values of 80 and 106 for A and B respectively, produce acceptable interpolation when MAX_FILTER is equal to 107.

Figure 2A:
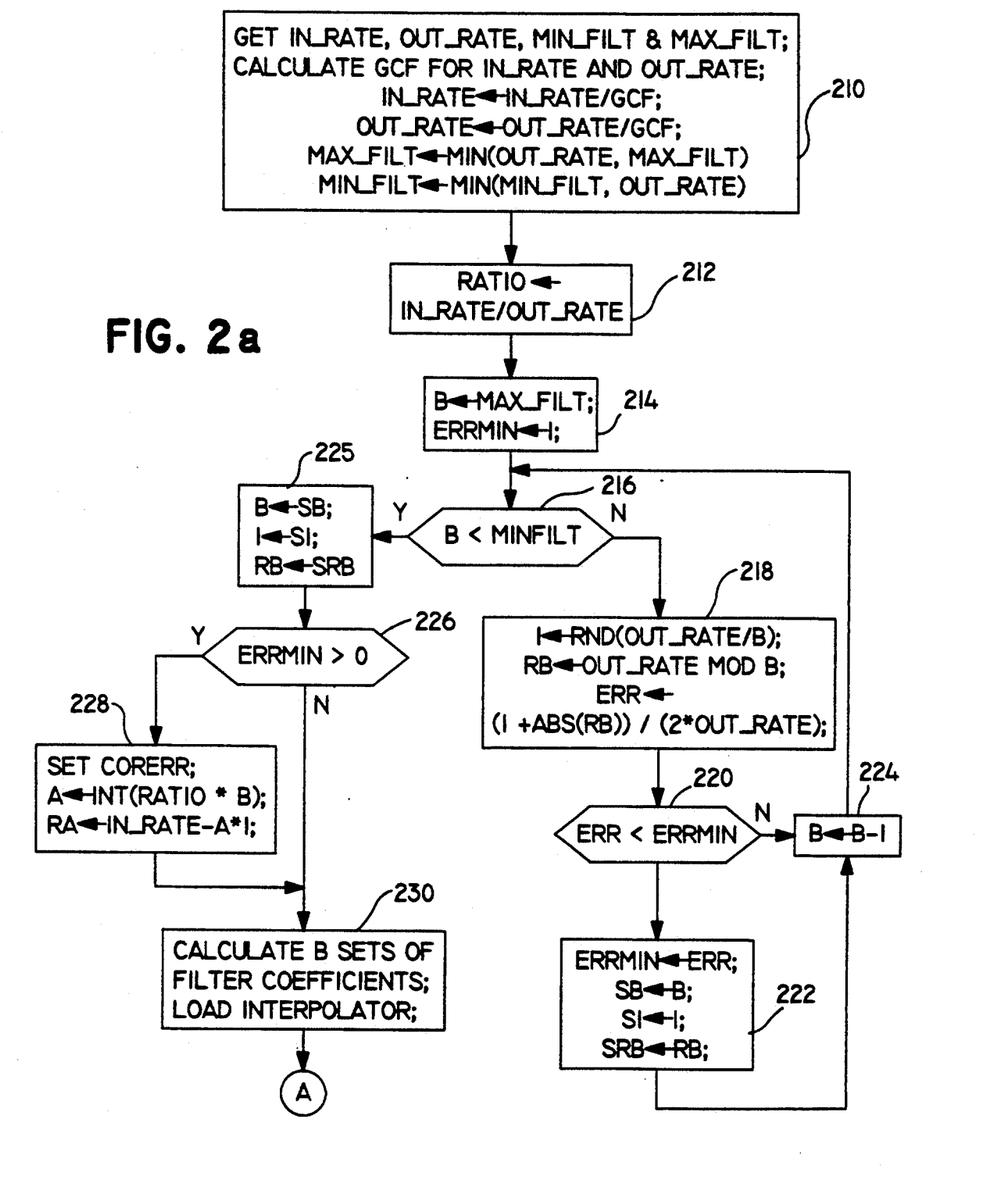
FIGS. 2a and 2b are flow chart diagrams which are useful for explaining the operation of the circuitry shown in FIG. 1.
Figure 2B:
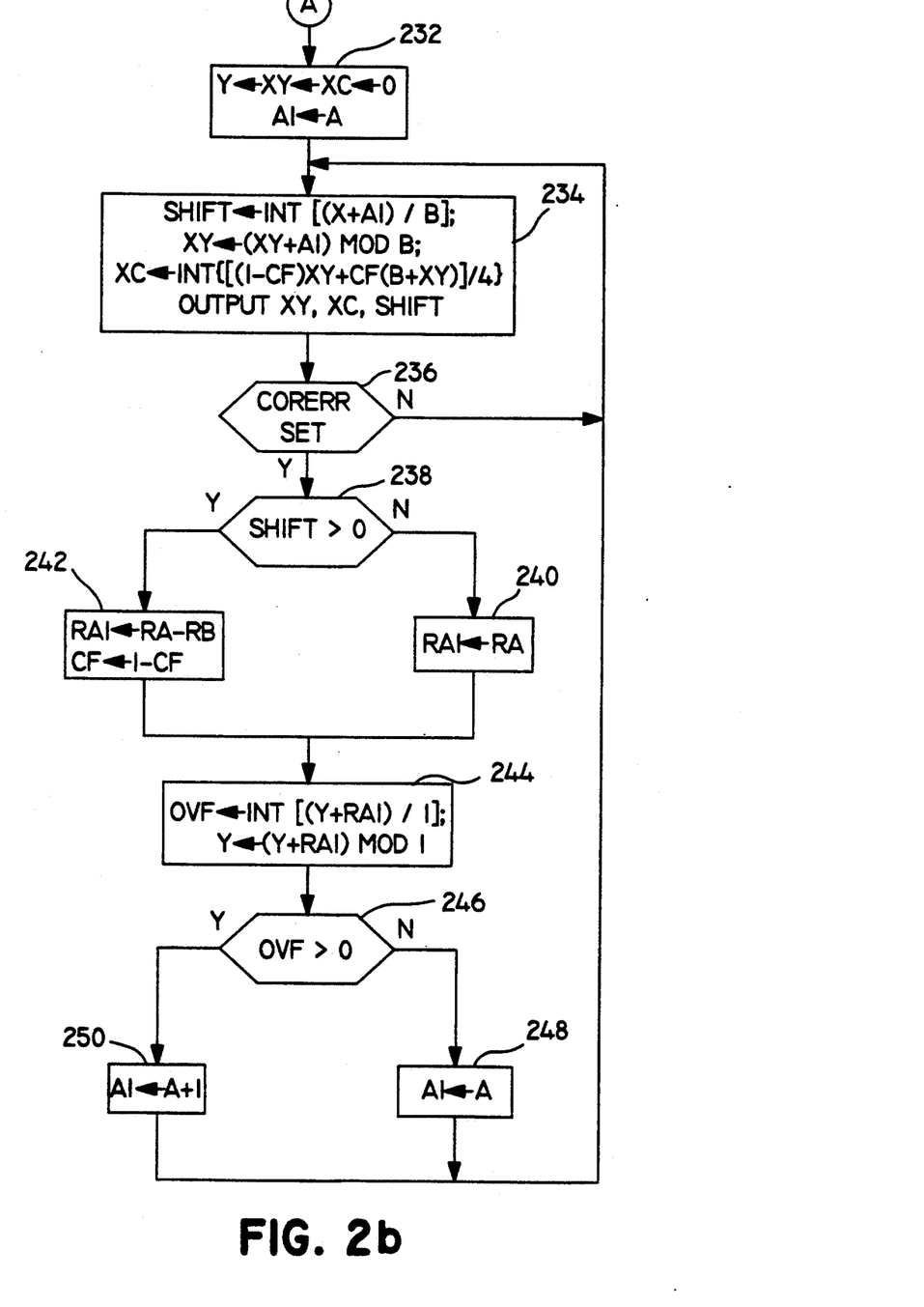

This first step of FIG. 2b sets temporary value variables XY, XC, Y and CF to initial values of 0 and sets a variable A1 to the current value in A. After step 232, step 234 is executed. This step calculates a variable SHIFT according to equation (4).

$$SHIFT \times INT((XY_i + A1) / B) \quad (4)$$

If the value of SHIFT is 1, the value of CF is toggled (i.e. if it was 1 it becomes 0 and if it was 0 it becomes 1). Next, new values XY and XC are computed according to equations (5) and (6).

$$XY_{i+1} = (XY_i + A1) \bmod B \quad (5)$$

$$XC_{i+1} = INT\{[(1-CF)XY_{i+1} + CF(B + XY_{i+1})]/4\} \quad (6)$$

The values $XY_{i+1}$ and $XC_{i+1}$ specify, respectively, which of the B luminance filters and B/2 chrominance filters are to be used for the $i+1^{th}$ luminance interpolation and chrominance interpolation, respectively. The contents of the variable SHIFT becomes a signal which is applied to the FIFO buffer 114 to cause it to provide the next sample to the interpolation filter 116.

At step 236, the process shown in FIG. 2b determines if the variable CORERR is set. If this variable is not set, then the calculations performed at step 234 are exact because an exact ratio A/B was found which equaled the ratio of IN_RATE/OUT_RATE. If CORERR is not set, control branches back to step 234 to calculate the next values for the variables SHIFT, CF, XY and XC.

If at step 236, CORERR is set, then control is transferred to step 238. This step and the steps which follow calculate the error as it accumulates from the use of the approximation of A/B to represent the sample rate ratio IN_RATE/OUT_KATE. Step 238 determines if the value SHIFT calculated at step 234 is 1. If it is, then at step 242, a variable RA1 is set to RA-RB. Otherwise, at step 240, the variable RA1 is set to RA. After steps 242 and 240, the step 244 is executed. This step computes the new error value, $Y_{i+1}$, and the error overflow value, OVF, according equations (7) and (8).

$$OVF_{i+1} - INT((Y_i + RA1) / I) \quad (7)$$

$$Y_{i+1} = (Y_i + RA1) \bmod I \quad (8)$$

The value $(Y_i + RA1) / I$ is a measure of the error in the interpolation, accumulated over i sample intervals, caused by the use of the approximation A/B instead of the actual sample rate ratio, IN_RATE/ OUT_RATE. When the value OVF becomes greater than 0, i.e., when the integer component of the error as calculated at step 244 is greater than or equal to 1, the approximate ratio is changed to reduce the error. This occurs at step 250 when the variable A1 is assigned a value, A+1. This step reduces the error by one intersample interval.

If at step 246, the value OVF is found to be equal to 0, the variable A1 is set to A at step 248. After step 248, or step 250, control returns to step 234 to calculate the next filters to be used in the interpolation process.

Figure 3:
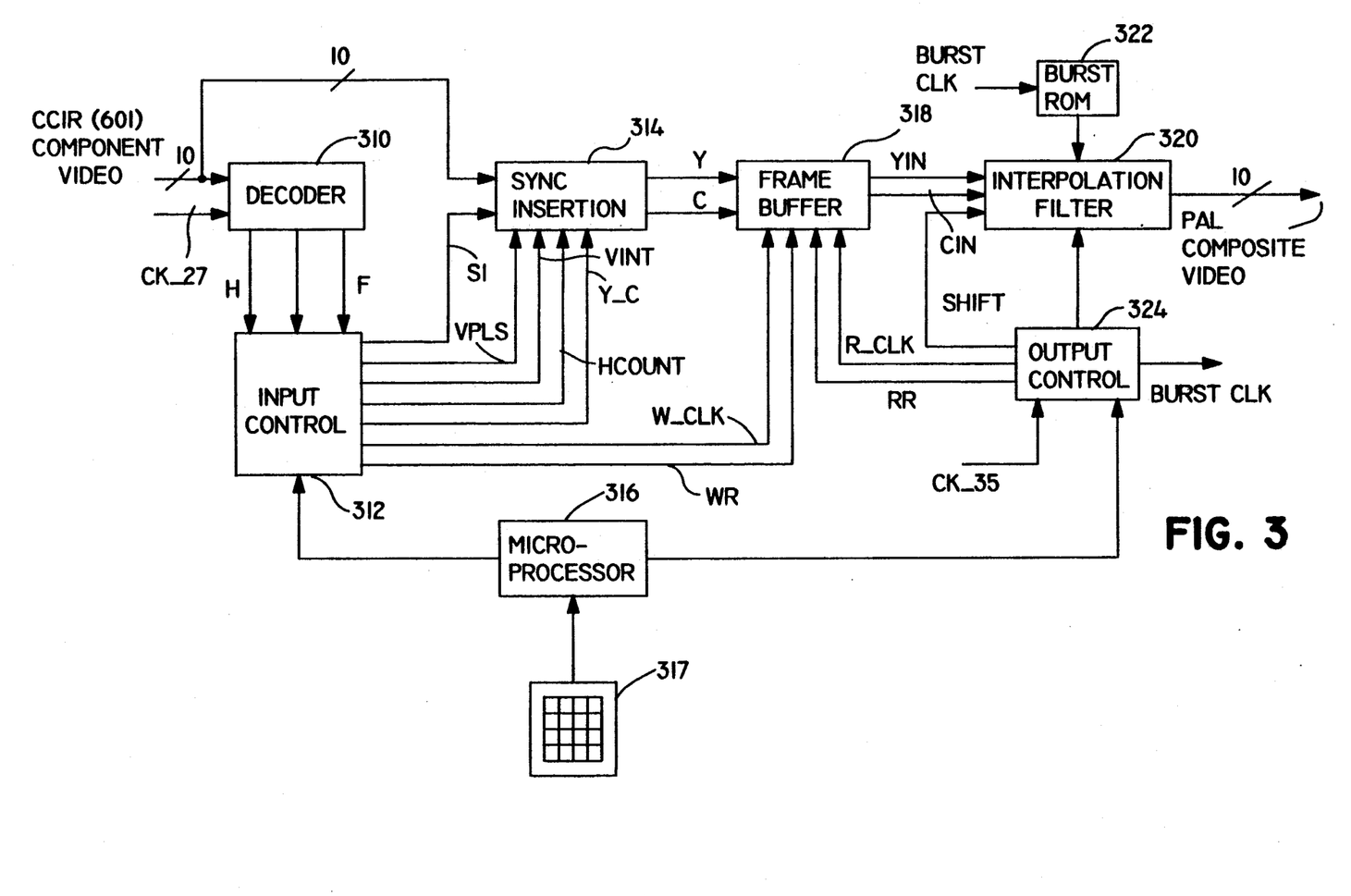
FIG. 3 is a block diagram of an exemplary sample rate conversion system for converting CCIR (601) video signals into PAL video signals.

Referring to FIG. 3, the process illustrated by FIGS. 2a and 2b may be implemented in the microcomputer 316 in which case the output control circuitry 324 merely routes the signals SHIFT, XY and XC to the interpolation filter 320 and synchronizes them with the clock signal provided by the clock generator. Alternatively, only the part of the process shown in FIG. 2a may be implemented in the microcomputer 316. In this instance, the output control circuitry 324 may include circuitry such as that shown in FIG. 5, described below, which implements the operations shown in FIG. 2b. The circuitry shown in FIG. 3 and the process shown in FIGS. 2a and 2b implement a generalized resampling system in which desired input and output sample rates are applied to the system along with the input samples to produce the resampled output signal.

A specific example of this sampling technique is described below with references to FIGS. 3 through 5. This system converts video signals which conform to the 25 Hz CCIR (601) Digital Video Standard to digital video signals compatible with the PAL Standard sampled at 4 times the color subcarrier frequency ($4F_{SC}$).

In the system shown in FIG. 3, a ten-bit CCIR (601) video signal having a sample rate of 27 MHz is applied to a CCIR (601) decoder 310 along with an accompanying 27 MHz clock signal CLK_27. Under the CCIR (601) standard, this ten-bit signal includes alternating ten-bit samples of luminance and chrominance signals where the chrominance signal includes two color-difference signals CA and CB (i.e. U and V, respectively). The CCIR (601) decoder 310 extracts a horizontal line blanking signal H and a vertical field blanking signal F from the ten-bit samples and applies these two signals and the 27 MHz clock signal to input control logic 312.

The input control logic 312 includes a pair of counters (not shown) and a frequency-divide-by-two circuit (not shown). The logic 312 divides the clock signal CLK_27 in frequency by 2 to produce a 13.5 MHz clock signal Y_C. In addition, the control logic 312 provides a 10-bit signal HCOUNT which indicates the current horizontal pixel position of the CCIR (601) pixel value. The control logic 312 also provides two signals, VPLS and VINT which indicate, respectively, when a vertical synchronization pulse is to occur and when the vertical blanking interval is to occur. The control logic 312 may also generate a signal SI which determines when synchronization samples are to be inserted into the CCIR (601) sample stream.

In addition to being applied to the decoder 310, the ten-bit TDM video signal, representing the luminance and chrominance signal components, is applied to sync insertion circuitry 314. The input control logic 312 provides the signals SI, Y_C, HCOUNT, VPLS and VINT to the circuitry 314.

Figure 3A:
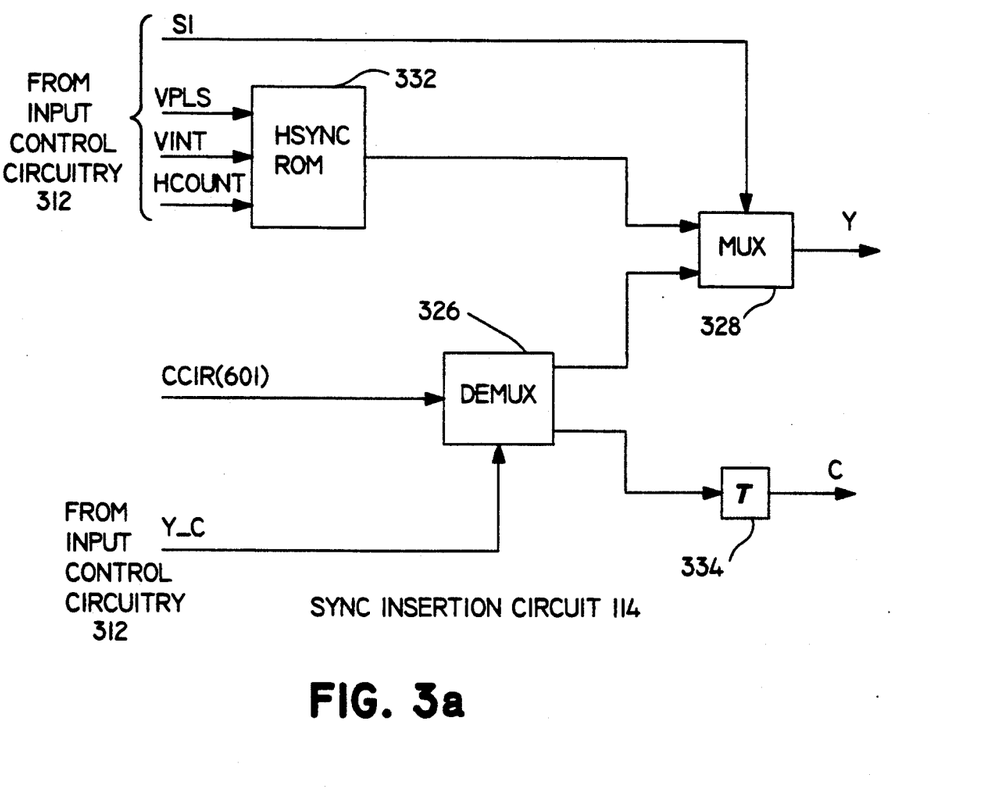
FIG. 3a is a block diagram of synchronization signal insertion circuitry suitable for use in the sample rate conversion system shown in FIG. 3.

Exemplary sync insertion circuitry 314 is shown in FIG. 3A. In this circuit, the ten-bit CCIR (601) signal is applied to the data-input port of a demultiplexer 326 which is coupled to receive the signal Y_C as its control signal. The demultiplexer 326 provides samples of the luminance signal Y at one of its two output ports, and samples of the chrominance signal C at the other output port. The luminance samples are applied to one input port of a multiplexer 328. The other input port to the multiplexer 328 is coupled to receive a synchronization signal SYNC from a ROM 332.

The ROM 332 is addressed by values provided by the input control block 312. These address values are composed of the ten-bit signal HCOUNT concatenated with the single-bit signals VPLS and VINT. This address signal uniquely describes the position of the current CCIR (601) pixel on the horizontal line and the vertical field of the image. These values are applied to the address input port of the ROM 332 which, in response, produces samples representing horizontal and vertical synchronization signals. These samples are applied to the second input port of the multiplexer 328. The multiplexer 328 is controlled by the signal SI such that, when signal SI is in a logic-high state, samples from the ROM 332 are provided as the luminance signal Y; and when SI is in a logic-low state, samples from the demultiplexer 326 are provided as the signal Y. The circuit also includes a delay element 334 which compensates the chrominance signal for processing delays through the multiplexer 328.

Returning to FIG. 3, the signals Y and C developed by the sync-insertion circuitry 314, are applied to a frame buffer 318. Buffer 318 also receives a 13.5 MHz write clock signal W_CLK and a write reset signal WR from input control logic control 312. Frame buffer 318 also receives a 17.7 MHz read clock signal R_CLK and a read reset signal RR from output-control logic 324, described below. In this configuration, the frame buffer 318 acts as a large first-in, first-out (FIFO) memory. Data values representing the luminance signal Y and chrominance signal C are written into the buffer 318 synchronous with the signal W_CLK and the buffer 318 is reset to its starting write address value responsive to the signal WR. Samples are read from the buffer 318 synchronous with the signal R_CSK and the starting address value for reading samples from the buffer is reset by the signal RR. By controlling when the write and read address values are reset by the respective signals WR and RR, the system can implement a delay of up to one frame interval. This is desirable for studio applications where the PAL signal produced by the system may need to be delayed by as much as one frame interval to synchronize it with a video signal from another source.

The luminance and chrominance signals provided by the frame buffer 318 are applied to the interpolation filter 320 as the signals YIN and CIN respectively. Interpolation filter 320 also receives a signal SHIFT and other control signals (i.e. XY and XC) from output-control circuitry 324. In addition, the filter 320 receives a burst signal from burst ROM 322.

As described in the above-referenced patent, the interpolation filter 320 resamples the luminance and chrominance samples stored in the frame buffer 318, converts the chrominance samples into a modulated chrominance component signal and adds the modulated chrominance signal to the luminance signal to produce the PAL output signal.

Figure 4A:
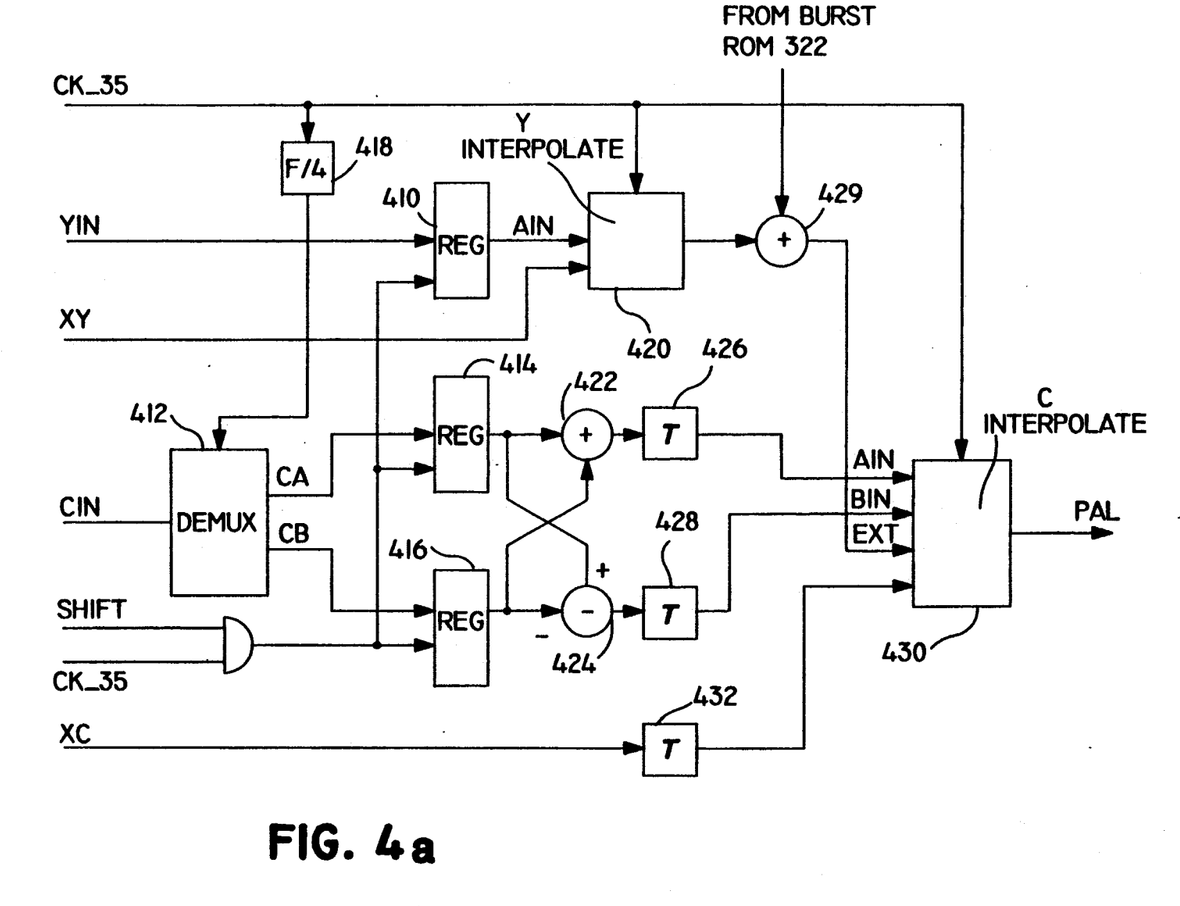
FIG. 4a and 4b is a block diagram of an interpolation filter suitable for use in either of the sample rate conversion systems shown in FIGS. 1 and 3.

FIG. 4a is a block diagram of circuitry suitable for use as the interpolation filter 320. This filter operates using a 35.468944 MHz (hereinafter 35.5 MHz) clock signal, CK_35. As shown in this Figure, the signal YIN is applied to a register 410 while the signal CIN is applied to a demultiplexer 412. The demultiplexer 412 separates the alternate CA and CB samples into two separate sample streams, responsive to a 8.9 MHz ($2F_{SC}$) clock signal which is derived from the signal CK_35 by the frequency-divide-by-four circuit 418. The two output signals of the demultiplexer 412 are applied respectively to registers 414 and 416.

The registers 410, 414 and 416 are responsive to the logical AND of the signal SHIFT and the 13.5 MHz clock signal to load a new value of the respective signals YIN, CA and CB when the signal SHIFT indicates that a new sample is provided by the frame buffer 318, shown in FIG. 3.

The output values held in the register 410 are read by a luminance interpolator 420 which resamples the signal YIN in accordance with the luminance coefficient addresses indicated by the signal XY, provided by the output control circuitry 324, shown in FIG. 3. The samples produced by this interpolator conform to the luminance component of a sampled data PAL video signal. Circuitry suitable for use as the interpolator 420 is described below with reference to FIG. 4b.

The resampled luminance signal generated by the interpolator 420 is applied to one input port of an adder 429, the other input port of which is coupled to receive the samples from the burst ROM 322, shown in FIG. 3. Responsive to this signal, digital samples representing a black-level correction term and the color reference burst signal (only during the burst interval) are added to luminance samples.

The samples held by the registers 414 and 416 are combined by an adder 422 and a subtracter 424 which generate, respectively, the signals (CA+CB) and (CA−CB) at their output ports. These signals are applied to respective compensating delay elements 426 and 428 which compensate for the processing delay of the luminance signal through the interpolator 420. The delayed (CA+CB) and (CA−CB) signals provided by the delay elements 426 and 428 are applied to respective input ports AIN and BIN of a chrominance interpolator 430. The PAL luminance signal with the color reference burst signal is applied to an input terminal EXT of the interpolator 430. The sequence of filters used by the chrominance interpolator 430 is determined by the signal XC which is applied to the interpolator through a compensating delay element 432. The delay element 432 matches the coefficient values to the samples provided by the delay elements 426 and 428.

The interpolator 430 processes the (CA−CB) and (CA+CB) signals to generate a sequence of samples, at the PAL sampling rate of 17.7 MHz which have the format (CA±CB), (CA∓CB), −(CA+CB), −(CA∓CB), (CA+CB), ... The + and ∓ operations indicate corresponding sample values on successive lines of the video signal (i.e. +,− on one line and −,+ on the next line). These samples are combined with the interpolated luminance samples, Y, to generate a signal having the format Y+(CA ±CB), Y+(CA∓CB), Y−(CA±CB), Y−(CA∓CB), Y+(CA±CB), ... If CA and CB are the U and V color difference signals, respectively, this sequence is readily recognizable as representing a sampled data PAL color video signal.

Figure 4B:
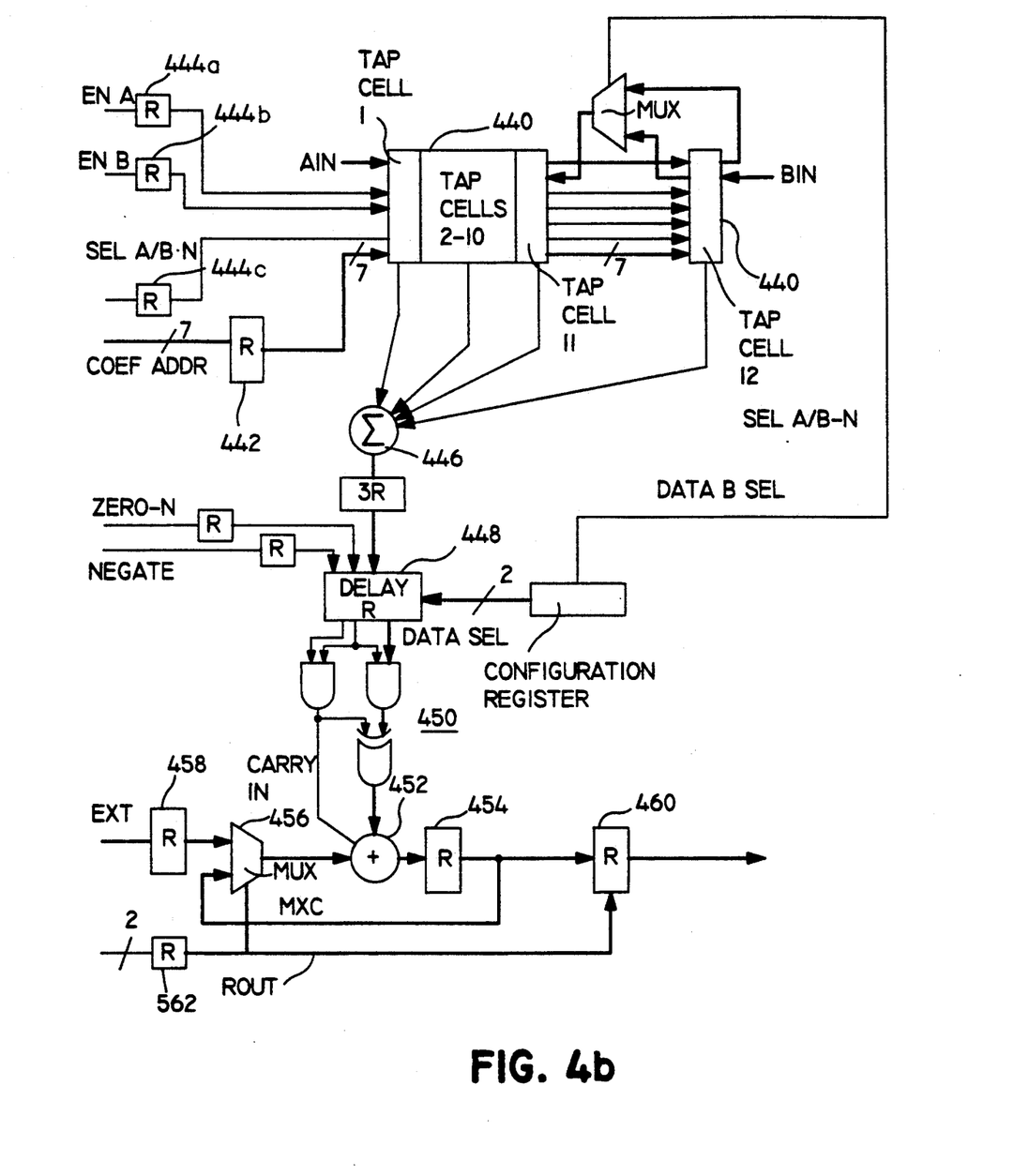

FIG. 4b is a block diagram, partly in logic diagram form of an exemplary interpolator which may be used as either of the interpolators 420 or 430. As shown in FIG.

4b, the signals AIN and BIN are applied to a bidirectional twelve-tap delay line 440. In the exemplary circuit, each tap of the delay line may be programmed with as many as 107 different coefficient values. In response to a coefficient address signal (i.e. either XY or XC) provided by the output-control circuitry 324, each of the tap cells of the delay line 440 multiplies its AIN or BIN data value by the selected coefficient value. Each value of the coefficient address signal causes the delay line 440 to use a different set of coefficient values and, thus, to implement a different filter. The B interpolation filters used in this embodiment of the invention are implemented through B different sets of coefficients addressed by the signals XY and XC.

For the luminance interpolator 420, only the AIN input port is used, the BIN input port is disabled by holding the EN B signal logic-low. For the chrominance interpolator 430, the (CA+CB) signal is applied to the AIN input port while the (CA−CB) signal is applied to the BIN input port. For the sake of brevity, only the operation of the chrominance interpolator 430 is described below. From this description and from the above-referenced U.S. patent, one of ordinary skill in the art could readily determine control signals to operate the luminance interpolator 420.

In the chrominance interpolator 430, each of the AIN and BIN input ports is coupled to a respective shift register which provides multiple taps for implementing a respective finite impulse response (FIR) filter. The AIN samples from all of the tap cells are multiplied by the respective coefficient values and then summed by the summing block 446. In the next sample interval, the BIN values held by the respective tap cells are multiplied by the same coefficient values and summed in the summing circuit 446. Thus, the summing block 446 alternately provides samples of the two filtered chrominance signals, (CA+CB) and (CA−CB), to a programmable delay element 448. In this embodiment of the invention, the delay element 448 is set to its minimum delay value.

The samples provided by the delay element 448 may be represented by a sequence (CA+CB), (CA−CB), (CA+CB), (CA−CB), (CA+CB), (CA−CB), . . . These samples are applied to a selective inverting circuit 450. The circuitry 450 is controlled by a signal NEGATE provided by the output-control circuitry 324. In the exemplary embodiment of the invention, the signal NEGATE causes every other pair of samples of the interpolated chrominance signals to be inverted so that the sequence of samples applied to the adder 452 is (CA+CB), (CA−CB), −(CA+CB), −(CA−CB), (CA+CB), (CA−CB), . . . The inversion of chrominance sample pairs is shifted by one sample position from line-to-line to mimic the 90° phase shift of the CB (V) color difference signal from line-to-line which is defined by the PAL standard.

The adder 452 is part of an accumulator which includes register 454 and multiplexer 456. In the exemplary embodiment of the invention, successive samples of the interpolated luminance signal Y are applied to one input port of the adder 452 via an external input port EXT through a register 458 and a multiplexer 456 while the chrominance sample stream provided by the delay element 448 is applied to the other input port of the adder 452. Thus, the output signal produced by the adder 452 is a sample stream Y+(CA±CB), Y+(-CA∓CB), Y−(CA±CB), Y−(CA∓CB), Y+(-CA±CB), . . . , where the symbol ± indicates that the samples are added on one line and subtracted on the next and the symbol ∓ indicates that the samples are subtracted on one line and added on the next. The summed luminance and chrominance samples are stored in the register 454 and then transferred to the register 460 synchronous with the next pair of sample values being applied to the adder 452. The register 460 provides output samples in the format and sample rate of a sampled data PAL composite video signal.

As set forth above, the burst ROM 322 provides a signal which corrects the black level of the samples provided by the luminance interpolator 420 to produce a desired black level for the PAL signal. During the burst interval, the ROM 322 also provides a sampled data burst signal at a predetermined phase as determined by the line number signal (not shown) and field number signal (not shown) provided by the output control circuitry 324.

Thus, the signal provided by the chrominance interpolator 430 is a sampled data PAL signal which includes a color reference burst signal and which has a corrected black level.

Figure 5:
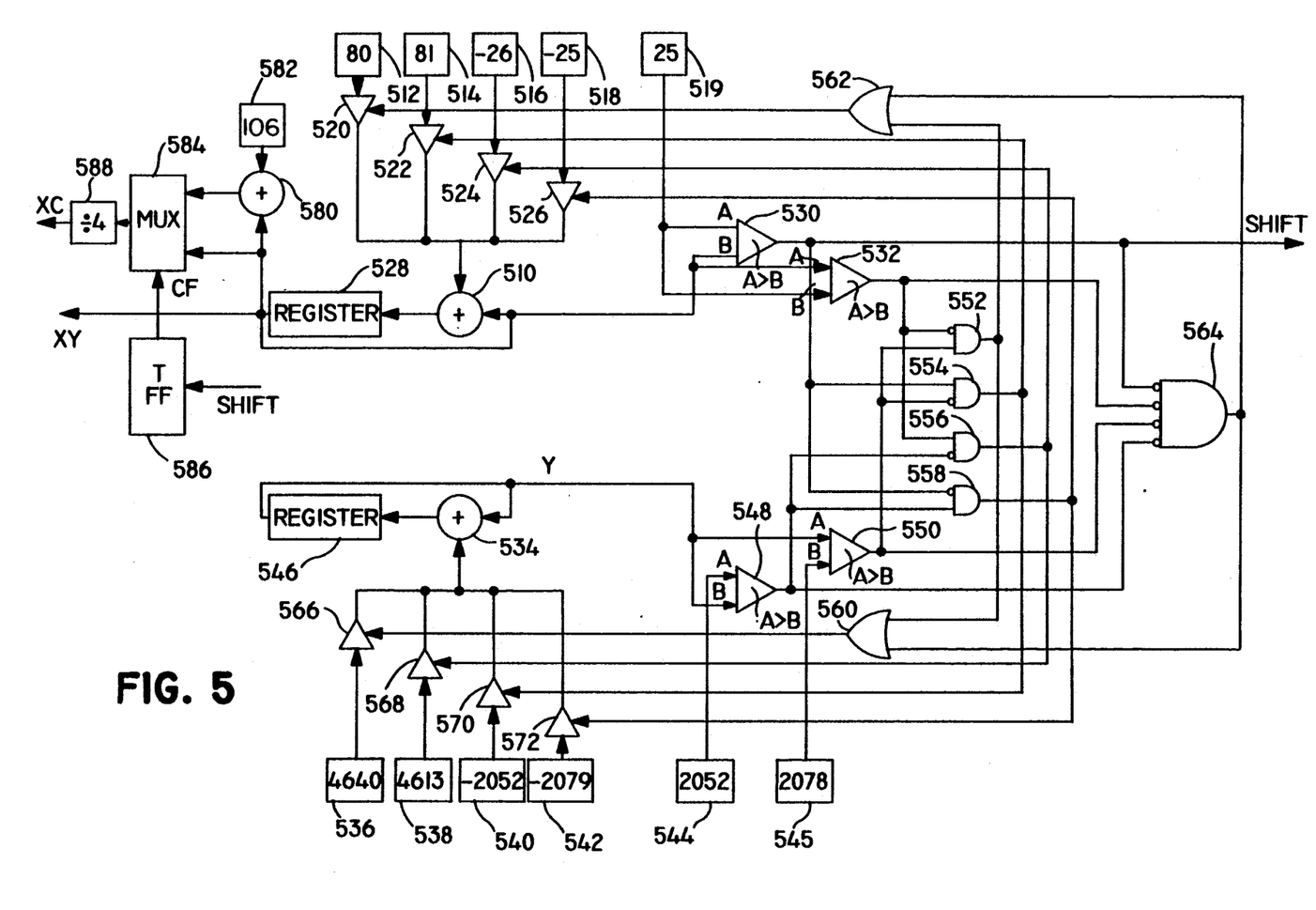
FIG. 5 is a logic diagram partly in block diagram form of exemplary output control circuitry suitable for use in the sample rate conversion systems shown in FIGS. 1 and 3.

FIG. 5 is a logic diagram, partly in block diagram form of circuitry suitable for use in the output control circuitry 324, shown in FIG. 3. The logic circuitry shown in FIG. 5 calculates the values XY, XC and SHIFT which are applied to the interpolation filter 320, also shown in FIG. 3. In addition, this circuitry calculates new values for the internal error signal Y. These are the same values that are calculated by the microcomputer 118, shown in FIG. 1 according to the equations (5), (6), (7), (8) and (9) reproduced below.

$$SHIFT = INT\,[(XY_i + A1)\,/\,B] \quad (5)$$

$$XY_{i+} = (XY_i + A1)\,MOD\,B \quad (6)$$

$$XC_{i+1} = INT\{[(1-CF)XY_{i+1} + CF(B+XY_{i+1})]/4\} \quad (7)$$

$$OVF_{i+1} = INT[(Y_i + RA1)\,/\,I] \quad (8)$$

$$Y_{i+1} = (Y_i + RA1)\,MOD\,I \quad (9)$$

In the circuitry shown in FIG. 5, B is 106, A is 80, RA is 4640, RB is 27 and I is 6692. Thus, A1 switches between 80 and 81 depending on whether the error is above or below the threshold, respectively. Similarly, RA1 switches between 4640 and 4613. Since division is difficult to implement in logic circuitry, the equations (5) through (9), as implemented in the logic circuitry shown in FIG. 5, have been simplified to eliminate the division.

In FIG. 5, register 528; adder 510; value sources 512, 514, 516, 518 and 519; three-state buffers 520, 522, 524, and 526; OR gate 562 and comparators 530 and 532 implement equations (4), (5) and (6). Register 546; adder 534; value sources 536, 538, 540, 542, 544 and 545; three-state buffers 566, 568, 570 and 572, OR gate 560 and comparators 548 and 550 implement equations (7) and (8). The AND gates 552, 554, 556, 558 and 564 produce control signals which are shared by the two circuits.

In this circuit, the three-state gates 520, 522, 524 and 526 selectively provide one of the values 80, 81, −26 and −25 to the adder 510 to be added to the value of XY held in the register 528. The values 80 or 81 are applied, depending on the value of A1, when the comparator 530 indicates that the result of adding the value to the current value of XY will be less than 106. Respective values of −26 and −25 are applied when the comparator 530 indicates that the result of adding 80 or 81, respectively, to the current value of XY would cause the result to be greater than 106. The value of XY produced by the adder 510 is the same as that of an addition of 80 or 81, modulo 106.

The comparator 530 compares the present value of XY, provided by the adder 510, to the value 25 provided by value source 519 and produces a logic-high output signal when XY is less than 25, (i.e. when the addition of 80 or 81 to XY will not produce a value greater than 106). Another comparator 532 also compares the current value of XY to 25 but produces a logic-high signal only when XY is greater than 25 (i.e. when the addition of 80 or 81 to XY will produce a value greater than 106). These signals are used, along with the output signals of the two error comparators 548 and 550, described below, to determine which of the values provided by the value sources 512, 514, 516 and 518 is to be applied to the adder 510.

The circuitry which implements equations (7) and (8) operates in a similar manner. The values, 4640, 4613, provided by the value sources 4640 and 4613, are the two values of RA1 corresponding to the error differential when the values of A1 are 80 and 81, respectively, and the values −2052 and −2079 are corresponding values which are used to implement modulo 6692 arithmetic.

The comparator 548 produces a logic-high signal only when the value of Y held in the register 546 is less than 2052. This signal indicates that the next value of Y (i.e. the result of adding either 4640 or 4613 to Y) will be less than 6692. Another comparator 550 provides a logic-high output signal only when the current value of Y is greater than 2078. This signal indicates that the next value of Y will be greater than 6692, and so, the appropriate negative value will be added to model modulo addition.

When XY is equal to 25 and Y is between 2052 and 2078, the output signals provided by all of the comparators 530, 532, 548 and 550 is logic-low. In this instance, the AND gate 564, via the OR gates 560 and 562 cause respective values of 80 and 4640 to be added to the values of XY and Y held in the registers 528 and 546, respectively.

As shown in FIG. 5, the value of XC is generated by selectively adding the value of XY to 106, depending on the value of the signal, CF, which is toggled between logic-low and logic-high each time that the signal SHIFT goes from logic-low to logic-high. The circuitry which implements this function includes adder 580, value source 582, multiplexer 584, trigger-type flip-flop 586 and integer divider 588.

The circuitry shown in FIG. 5 generates the signals XY, XC and SHIFT to control the interpolation filter 320, shown in FIG. 3. From the description set forth above, one of ordinary skill in the art could readily design circuitry which produces the signal NEGATE.

The circuitry shown in FIG. 5 may be readily modified to handle other input and output sample rates. For example, a system to convert video signals having an input sample rate of 18 MHz into a PAL compatible format may use the same circuitry as shown in FIG. 5 with different constants provided by the constant sources. For this modified converter, with B equal to 106, A would be 108 and the constant sources 512, 514, 516, 518 and 519 would provide the respective constant values 1, 2 (i.e. 107 mod 106 and 108 mod 106), −105, −104 and 104 while the constant sources 536, 538, 540, 542, 544 and 545 would provide the respective constant values 3929, 3902, −2763, −2790, 2763 and 2789.

Although the present invention has been described in terms of exemplary embodiments, it is contemplated that it may be practiced as outlined above within the spirit and scope of the appended claims.

We claim:

1. A sample rate conversion system which resamples a first sampled data signal having a first predetermined sample rate to generate a second sampled data signal having a second predetermined sample rate, the sample rate conversion system comprising:
   resampling means, responsive to a control signal for alternately resampling the first sampled data signal according to respective first and second approximate sample ratios to produce samples of the second sampled data signal which have respective sample position errors, such that, between any two consecutive samples of the second sampled data signal, an accumulated sample position error changes in a positive sense while resampling according to one of the first and second approximate sample ratios and changes in a negative sense while resampling according to the other of the first and second approximate sample ratios;
   monitoring means for accumulating the sample position errors of the samples produced by the resampling means to generate the control signal which causes the resampling means to switch between the first and second approximate sample ratios when the accumulated sample position error has a magnitude greater than a predetermined threshold value.

2. A sample rate conversion system according to claim 1, wherein the resampling means includes an interpolation filter having a number B of different interpolation filter characteristics and the resampling means operates by using a first subset of said B filter characteristics in a first distinct sequence, and a second subset of said B filter characteristics in a second distinct sequence responsive to the control signal.

3. A system according to claim 2 wherein the interpolation filter is a programmable finite impulse response (FIR) filter having storage for at least B sets of preprogrammed coefficient values, each of the sets defining a respectively different interpolation characteristic.

4. A system according to claim 3, wherein the first sampled data signal has a sample rate of 13.5 MHz, the second sampled data signal has a sample rate of 17.734475 MHz and the interpolation filter is programmed with 106 different sets of coefficients.

5. A system according to claim 4, wherein the first and second approximate sample ratios are 80 divided by 106 and 81 divided by 106, respectively.

6. A system according to claim 3, wherein the first sampled data signal has a sample rate of 18 MHz, the second sampled data signal has a sample rate of 17.734475 MHz and the interpolation filter is programmed with 106 different sets of coefficients.

7. A system according to claim 6, wherein the first and second approximate sample ratios are 107 divided by 106 and 108 divided by 106, respectively.

8. A video signal sample rate conversion system which resamples a first sampled data video signal having a first predetermined sample rate to generate a second sampled data video signal having a second predetermined sample rate, the sample rate conversion system comprising:

resampling means, responsive to a control signal for alternately subjecting the first sampled data signal to respective first and second interpolation operations, such that, between any two consecutive samples of the second sampled data signal, an accumulated sample position error changes in a positive sense while subjecting the first sampled data signal to one of the first and second interpolation operations and changes in a negative sense while subjecting the first sampled data signal to the other of the first and second interpolation operations;

monitoring means for accumulating the sample position errors of the samples produced by the resampling means to generate the control signal which causes the resampling means to switch between the first and second interpolation operations when the accumulated sample position error has a magnitude greater than a predetermined threshold value.

9. A video signal sample rate conversion system according to claim 8, further comprising:

means for receiving the first and second predetermined sample rates;

an interpolator which processes the first sampled data video signal to produce the second sampled data signal, said interpolator including a finite impulse response (FIR) interpolation filter having storage for at least a number B sets of filter coefficients;

means, responsive to the received first and second predetermined sample rates, for determining a group of B sets of filter coefficients to be used by said interpolation filter; and sequencing means for defining first and second sequences of sets of filter coefficients from said B sets of filter coefficients which define said first and second interpolation operations.

10. A video sample rate conversion system according to claim 9, wherein:

the B sets of filter coefficients are numbered 0 through B−1; and the sequence means defines the first sequence of sets of filter coefficients from said B sets of filter coefficients according to the equation $X_i = (X_{i-1} + A)$ MOD B, and defines the second sequence of sets of filter coefficients from said B sets of filter coefficients according to the equation $X_i = (X_{i-1} + A + 1)$ MOD B, where $X_i$ is the number of the next set of coefficients to be used by the interpolation filter, $X_{i-1}$ is the number of the current set of coefficients to be used by the interpolation filter, A is the largest integer that is less than the product of B multiplied by the ratio of the first sample rate to the second sample rate, and MOD B indicates division modulo B.

11. A video signal sample rate conversion system according to claim 9, wherein:

said first and second sampled data video signals each includes a luminance component sampled data signal and a chromiance component sampled data signal; and the interpolator processes the luminance component of the first sampled data video signal to produce the luminance component of the second sampled data video signal; and the system further comprises:

memory means for storing the samples of the first sampled data video signal at said first predetermined sample rate and for providing the stored samples in response to a control signal provided by the sequencing means;

a further interpolator, including an FIR interpolation filter having storage for at least B/2 sets of filter coefficients, which processes the chrominance component of the first sampled data video signal according to a further interpolation operation to produce the chrominance component of the second sampled data video signal;

means, coupled to the sequencing means for generating a signal, CF, which changes in between values of zero and one in response to the control signal for the memory means indicating that successive ones of said stored sample values are to be provided;

wherein the sequencing means further comprises means for defining a sequence of sets, XC, ordinally numbered first through Nth, where N is an integer, of filter coefficients, for the FIR interpolation filter, which defines the further interpolation operation according to the equation:

$$XC_{i+1} = INT\{[(1-CF)X_{i+1} + CF(B+X_{i+1})]/4\},$$

where i is an integer, $XC_{i+1}$ is the number of the i+1th set of the sequence of sets of filter coefficients to be used by the FIR interpolation filter, INT designates the integer portion of a real operand, and $X_{i+1}$ is the number of a next set of coefficients to be used by the interpolation filter.

12. A system according to claim 9, wherein the first sampled data video signal has a sample rate of 13.5 MHz, the second sampled data video signal has a sample rate of 17.734475 MHz and the interpolation filter is programmed with 106 different sets of coefficients.

13. A system according to claim 12, wherein each of said 106 sets of filter coefficients is numbered 0 through 105 and the first sequence of sets of filter coefficients is defined by the equation $X_{i+1}32 (X_i+80)$ MOD 106 and the second sequence of sets of filter coefficients is defined by the equation $X_{i+1} = (X_i+81)$ MOD 106, where $X_{i+1}$ pk is the number of a next set from the sequence of sets of filter coefficients to be used by the interpolation filter, $X_i$ is the number of a current set of coefficients used by the interpolation filter, and MOD 106 indicates division modulo 106.

14. A system according to claim 9, wherein the first sampled data video signal has a sample rate of 18 MHz, the second sampled data video signal has a sample rate of 17,734475 MHz and the interpolation filter is programmed with 106 different sets of coefficients.

15. A system according to claim 14, wherein each of said 106 sets of filter coefficients is numbered 0 through 105 and the first sequence of sets of filter coefficients is defined by the equation $X_{i+1} = (X_i+1)$ MOD 106 and the second sequence of sets of filter coefficients is defined by the equation $X_{i+1} = (X_i+2)$ MOD 106, where $X_{i+1}$ is the number of a next set of coefficients from the sequence of sets of filter coefficients to be used by the interpolation filter, $X_i$ is the number of a current set of coefficients used by the interpolation filter, and MOD 106 indicates division modulo 106.

* * * * *

UNITED STATES PATENT AND TRADEMARK OFFICE
CERTIFICATE OF CORRECTION

PATENT NO. : 5,331,346
DATED : July 19, 1994
INVENTOR(S) : Shields et al.

It is certified that error appears in the above-indentified patent and that said Letters Patent is hereby corrected as shown below:

column 13, line 46, the word "sequence" should be --sequencing--.

column 14, line 44, the numeral "32" should be $--\bar{X}_{i+1} = (X_i--$.

column 14, line 47, "pk" should be deleted.

Signed and Sealed this

Twenty-ninth Day of November, 1994

Attest:

BRUCE LEHMAN

*Attesting Officer*         *Commissioner of Patents and Trademarks*